(12) United States Patent
Lashley et al.

(10) Patent No.: US 9,535,854 B2
(45) Date of Patent: *Jan. 3, 2017

(54) BUILDING AN UNDO LOG FOR IN-MEMORY BLOCKS OF DATA

(71) Applicant: INTERNATIONAL BUSINESS MACHINES CORPORATION, Armonk, NY (US)

(72) Inventors: Scott D. Lashley, Portland, OR (US); John F. Miller, III, Lake Oswego, OR (US)

(73) Assignee: International Business Machines Corporation, Armonk, NY (US)

( * ) Notice: Subject to any disclaimer, the term of this patent is extended or adjusted under 35 U.S.C. 154(b) by 162 days.

This patent is subject to a terminal disclaimer.

(21) Appl. No.: 14/312,926

(22) Filed: Jun. 24, 2014

(65) Prior Publication Data

US 2015/0186301 A1    Jul. 2, 2015

Related U.S. Application Data

(63) Continuation of application No. 14/144,445, filed on Dec. 30, 2013.

(51) Int. Cl.
*G06F 12/14* (2006.01)
*G06F 11/14* (2006.01)
(Continued)

(52) U.S. Cl.
CPC .......... *G06F 12/1425* (2013.01); *G06F 3/065* (2013.01); *G06F 3/067* (2013.01); *G06F 3/0619* (2013.01);
(Continued)

(58) Field of Classification Search
CPC .. G06F 11/1471; G06F 11/1474; G06F 13/24; Y10S 707/99953
See application file for complete search history.

(56) References Cited

U.S. PATENT DOCUMENTS 6,178,519 B1 * 1/2001 Tucker .............. G06F 17/30607
707/999.01
6,185,577 B1 * 2/2001 Nainani .............. G06F 11/1471
(Continued)

FOREIGN PATENT DOCUMENTS

JP           S63132351       6/1988

OTHER PUBLICATIONS

Mark Sullivan et al. "Using Write Protected Data Structures to Improve Software Fault Tolerance in highly Available Database Management Systems"; 10 pages; Dated 1991.*
(Continued)

*Primary Examiner* — Brian Misiura
(74) *Attorney, Agent, or Firm* — Janaki K. Davda; Konrad, Raynes, Davda & Victor LLP

(57) ABSTRACT

Provided are techniques for building an undo log for in-memory blocks of data. Permission on a block of data in memory is set to prevent updates to that block of data using a memory protection function. In response to an update operation attempting to update the block of data in the memory, an interrupt with a location of the block of data is received, the block of data is copied to an undo log entry in an undo log, and the permission on the block of data in the memory is set to allow the update to that block of data to proceed using the memory protection function.

5 Claims, 6 Drawing Sheets

(51) Int. Cl.
*G06F 13/24* (2006.01)
*G06F 3/06* (2006.01)
*G06F 11/00* (2006.01)

(52) U.S. Cl.
CPC ........... *G06F 11/00* (2013.01); *G06F 12/1483* (2013.01); *G06F 13/24* (2013.01); *G06F 2212/1052* (2013.01)

(56) References Cited

U.S. PATENT DOCUMENTS

| | | | |
|---|---|---|---|
| 6,374,264 B1* | 4/2002 | Bohannon | G06F 11/1471 |
| 6,981,004 B2* | 12/2005 | Ganesh | G06F 17/30371 |
| 7,234,076 B2* | 6/2007 | Daynes | G06F 17/30607 714/15 |
| 7,478,210 B2* | 1/2009 | Saha | G06F 9/30032 707/999.202 |
| 7,761,732 B2* | 7/2010 | Kern | G06F 11/1435 714/6.12 |
| 7,908,265 B2* | 3/2011 | Abadi | G06F 8/443 707/713 |
| 8,219,769 B1* | 7/2012 | Wilk | G06F 11/1464 707/640 |
| 8,396,937 B1 | 3/2013 | O'Krafka et al. | |
| 8,473,952 B2 | 6/2013 | Marathe et al. | |
| 8,484,166 B2* | 7/2013 | Gower | G06F 11/1412 707/678 |
| 9,003,106 B1* | 4/2015 | Clark | G06F 12/1416 711/103 |
| 9,251,003 B1* | 2/2016 | Gupta | G06F 11/1469 |
| 2008/0162840 A1 | 7/2008 | Augenstein | |
| 2010/0218195 A1 | 8/2010 | Adl-Tabatabai et al. | |
| 2011/0072207 A1 | 3/2011 | Jin et al. | |
| 2013/0024722 A1 | 1/2013 | Kotagiri et al. | |
| 2013/0103808 A1 | 4/2013 | Srinivasa et al. | |

OTHER PUBLICATIONS

Bohannon, P., et al., "Detection and Recovery Techniques for Database Corruption", IEEE Transactions on Knowledge and Data Engineering, vol. 15, No. 5, Sep./Oct. 2003, 17 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

Preliminary Amendment, Jun. 24, 2014, for U.S. Appl. No. 14/144,445, filed Dec. 30, 2013 by S.D. Lashley et al., Total 5 pp. [57.322 (PrelimAmend)].

U.S. Appl. No. 14/144,445, filed Dec. 30, 2013, entitled "Building an Undo Log for In-Memory Blocks of Data", invented by S.D. Lashley et al., Total 28 pp. [57.322 (Appln)].

Yan, Z., et al.. "SUV: A Novel Simple-Update Version-Management Scheme for Hardware Transactional Memory Systems", IEEE 26th International Parallel and Distributed Processing Symposium, May 2012, 13 pp.

English Abstract for JPS63132351, published Jun. 4, 1988, Total 2 pp.

International Search Report, Jan. 13, 2015, for International Application No. PCT/JP2014/005159, Total 2 pp.

International Search Report & Written Opinion, Jan. 13, 2015, for International Application No. PCT/JP2014/005159, Total 2 pp.

Kang, W., S. Lee, B. Moon, G. Oh, and C. Min, "X-FTL: Transactional FTL for SQLite Databases", SIGMOD'13, Proceedings of the 2013 ACM SIGMOD International Conference on Management of Data, ISBN: 978-1-4503-2037-5, Jun. 22-27, 2013, New York, New York, USA, © 2013 ACM, Total 12 pp.

Tamura, K., K. Kaneko, and A. Makihouchi, "Implementation of Implicit Lock on Object Database System ShusseUo", Computer System Symposium, Dec. 11, 2003, vol. 2003, No. 20, pp. 103-110. [Also Total 10 pp.].

Written Opinion, Jan. 13, 2015, for International Application No. PCT/JP2014/005159, Total 3 pp.

Office Action 1, Feb. 10, 2016, for U.S. Appl. No. 14/144,445, filed Dec. 30, 2013 by S.D. Lashley et al., Total 23 pp. [57.322 (OA1)].

Response to Office Action 1, May 10, 2016, for U.S. Appl. No. 14/144,445, filed Dec. 30, 2013 by S.D. Lashley et al., Total 9 pp. [57.322 (ROA1)].

International Preliminary Report, Jul. 14, 2016, for International Application No. PCT/JP2014/005159, Total 5 pp.

Final Office Action, Jun. 30, 2016, for U.S. Appl. No. 14/144,445, filed Dec. 30, 2013 by S.D. Lashley et al., Total 10 pp. [57.322 (FOA)].

Response to Final Office Action, Aug. 24, 2016, for U.S. Appl. No. 14/144,445, filed Dec. 30, 2013 by S.D. Lashley et al., Total 6 pp. [57.322 (RFOA)].

Notice of Allowance, Aug. 31, 2016, for U.S. Appl. No. 14/144,445, filed Dec. 30, 2013 by S.D. Lashley et al., Total 13 pp. [57.322 (NOA)].

* cited by examiner

BUILDING AN UNDO LOG FOR IN-MEMORY BLOCKS OF DATA

FIELD

Embodiments of the invention relate to building an undo log for in-memory blocks of data.

BACKGROUND

In-memory databases typically have the following characteristics: (1) most, if not all, data fits into memory, (2) most updates are applied in batch operations, and (3) most updates are appends of new data.

The data may be stored using any technique, such as relational or columnar.

When the update process is interrupted or aborted, the changes made to data in-memory need to be undone to keep the database consistent.

Most database systems use transaction logging, in which each individual update is logged, and, if the transaction is interrupted or aborted, the undo log is applied to roll back each individual change.

Some database systems may utilize a page tracking system (bufferpool) or intercept all updates at the application layer and perform unlog operations.

SUMMARY

Provided are a method, computer program product, and system for building an undo log for in-memory blocks of data. Permission on a block of data in memory is set to prevent updates to that block of data using a memory protection function. In response to an update operation attempting to update the block of data in the memory, an interrupt with a location of the block of data is received, the block of data is copied to an undo log entry in an undo log, and the permission on the block of data in the memory is set to allow the update to that block of data to proceed using the memory protection function.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Some operating systems provide a memory protection function (e.g., mprotect( )). Embodiments use the operating system's memory protection function to identify changed blocks of data in-memory for the purpose of building an undo log that can be used to restore the blocks of data in the event of an abort of the transaction that applied the update to the blocks of data.

Figure 1:
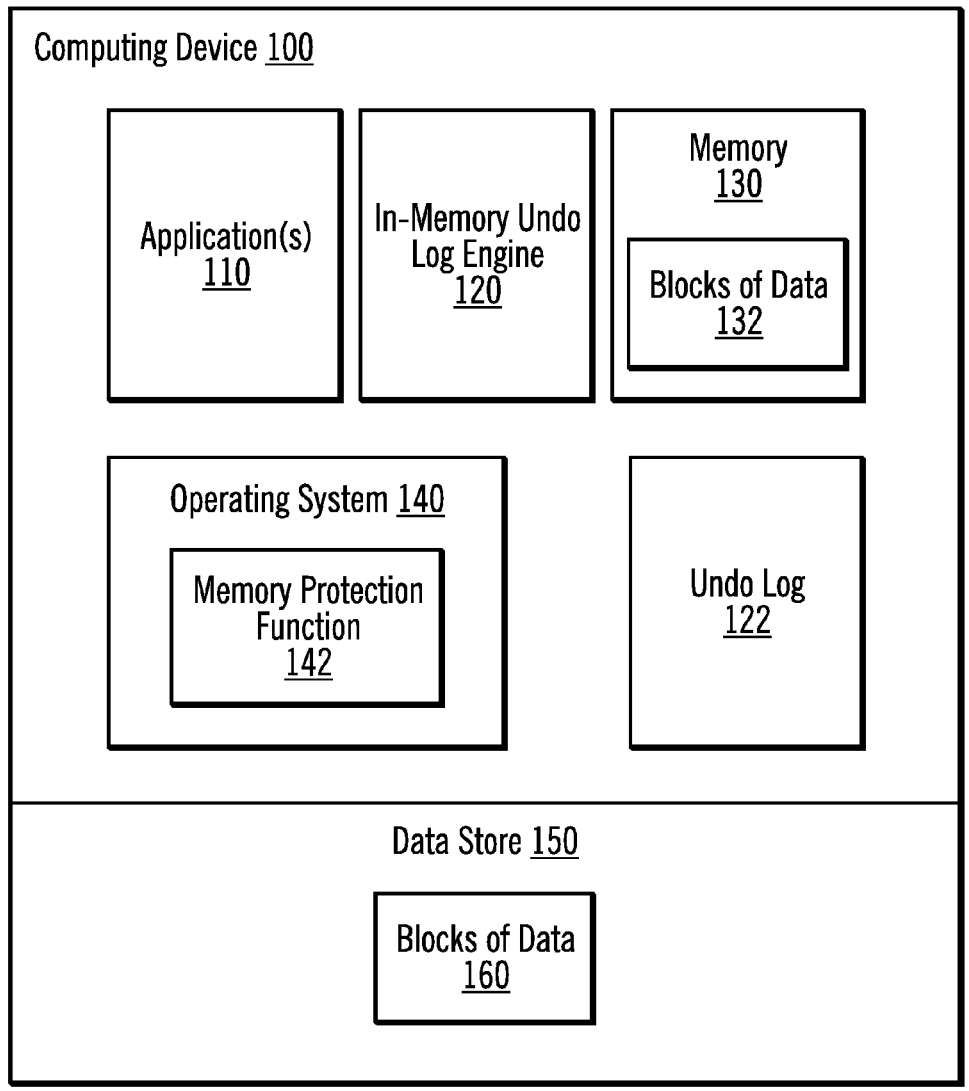
FIG. 1 illustrates, in a block diagram, a computing environment in accordance with certain embodiments.

FIG. 1 illustrates, in a block diagram, a computing environment in accordance with certain embodiments. A computing device 100 includes one or more applications 110, an in-memory undo log engine 120, memory 130, and operating system 140. The computing device 100 includes an undo log 122. The memory 130 stores blocks of data 132. The operating system 140 provides a memory protection function 142. The computing device 100 is coupled to data store 150, which includes blocks of data 160. Blocks of data in the memory 130 may be transferred to the data store 150 for storage. In certain embodiments, the data store 150 is part of the computing device 100. In alternative embodiments, the data store 150 is external to (and separate from) the computer device 100.

Figure 2:
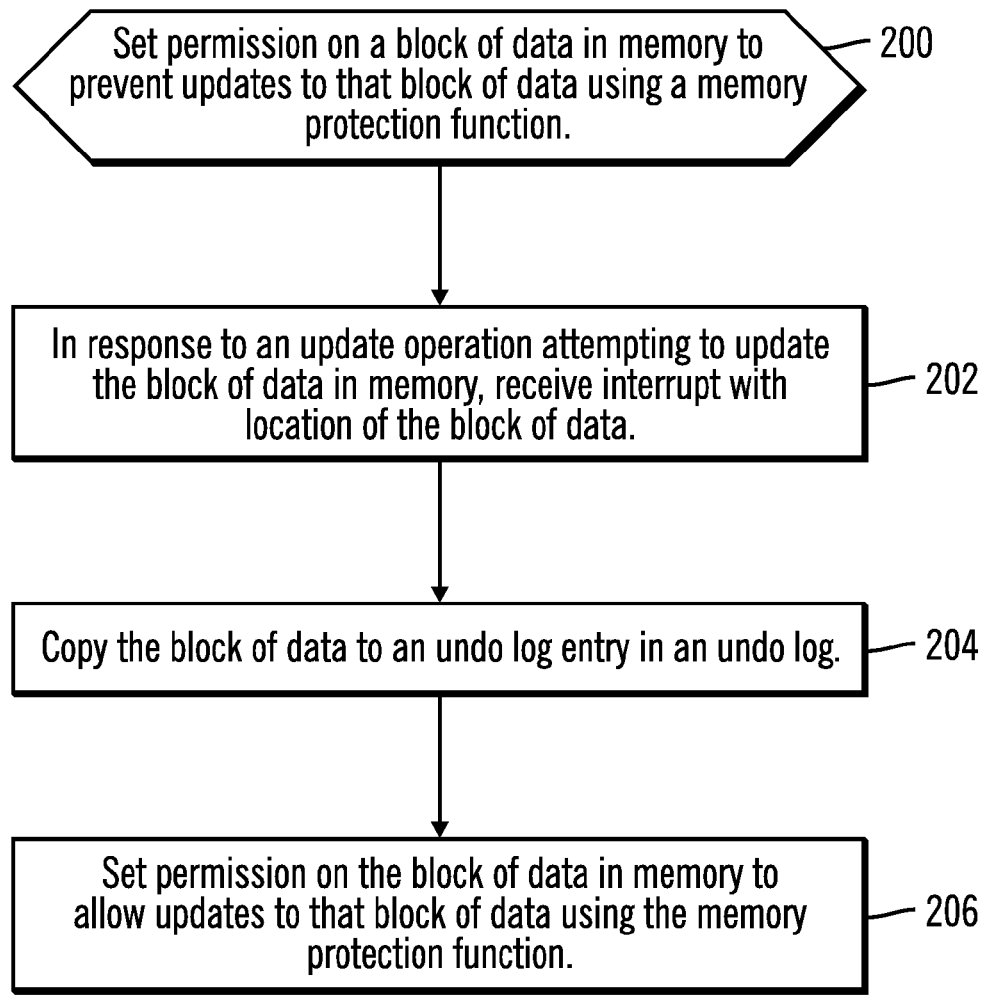
FIG. 2 illustrates, in a flow diagram, operations for logging in-memory updates in accordance with certain embodiments.

FIG. 2 illustrates, in a flow diagram, operations for logging in-memory updates in accordance with certain embodiments. Control begins at block 200 with the in-memory undo log engine 120 setting a permission on a block of data in memory to prevent updates to that block of data using a memory protection function. In certain embodiments, the permission is set to one value to block write access and set to another value to allow write access to the block of data in the memory. In certain embodiments, an update operation may be a modify operation that changes the block of data in memory, a delete operation that deletes the block of data from memory or an insert operation that inserts (adds) the block of data to memory. In certain embodiments, the block of data is part of a page of memory. In block 202, the in-memory undo log engine 120, in response to an update operation attempting to update the block of data in memory, receives an interrupt with a location of the block of data. In block 204, the in-memory undo log engine 120 copies the block of data to an undo log entry in an undo log. In block 206, the in-memory undo log engine 120 sets the permission on the block of data in memory to allow updates to that block of data using the memory protection function.

Figure 3:
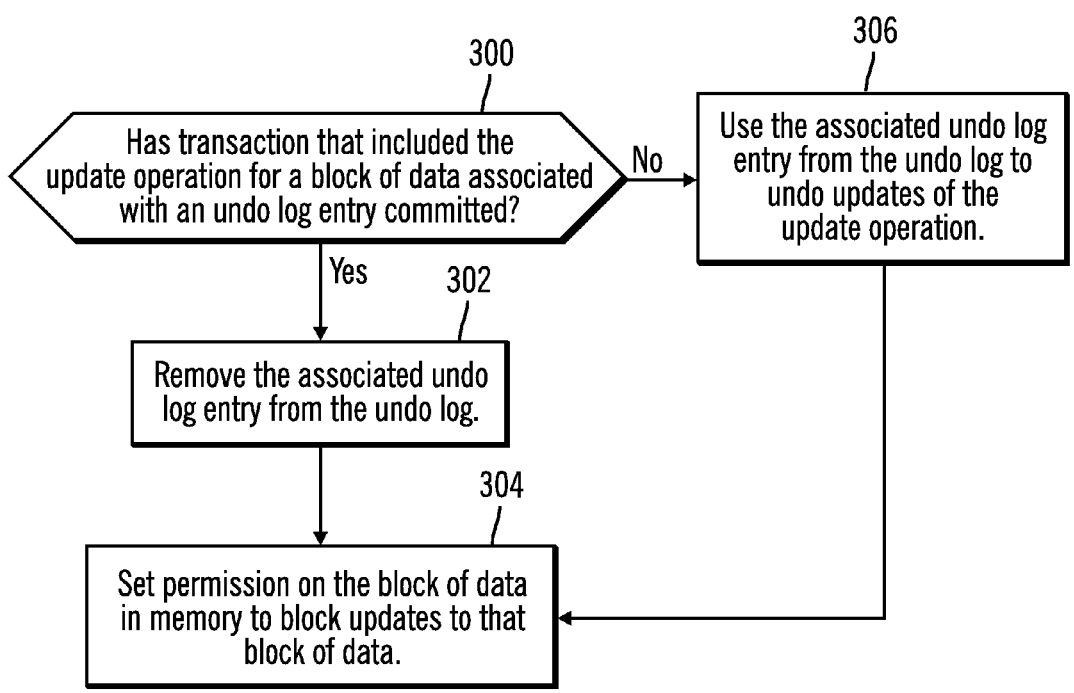
FIG. 3 illustrates, in a flow diagram, processing of an undo log in accordance with certain embodiments.

FIG. 3 illustrates, in a flow diagram, processing of an undo log in accordance with certain embodiments. Control begins at block 300 with the in-memory undo log engine 120 determining whether a transaction (batch operation) that included the update operation for a block of data associated with an undo log entry has committed. If so, processing continues to block 302, otherwise, processing continues to block 304. In block 302, the in-memory undo log engine 120 removes the associated undo log entry from the undo log. In block 304, the in-memory undo log engine 120 sets the permission on the block of data in memory to block updates to that block of data (e.g., sets the permission to read-only to block write access). In block 306 (because the transaction did not commit (e.g., the transaction failed)), the in-memory undo log engine 120 uses the associated undo log entry from the undo log to undo updates of the update operation (e.g., by copying the block of data from the undo log entry back to the memory). From block 306, processing continues to block 304.

The in-memory undo log engine 120 exploits the memory protection function (e.g., mprotect( )), which is an operating system mechanism that allows pages of memory to be marked with specific characteristics, including blocking write access to the specific memory page or range of pages) in order to track updates to the blocks of data. When a write protected page of data is updated, the operating system generates an interrupt (e.g., a segmentation fault (seg fault)). Thus, the in-memory undo log engine 120 uses faults to actually generate the contents of the undo log. The interrupt information includes a location (e.g., an address) of the block of data that an application was attempting to update. That location may be mapped to a specific portion of data. As part of the interrupt handling, the in-memory undo log engine 120 copies the block of data prior to the update to an undo log. Then, the memory page protection will be relaxed and the update will be allowed to proceed. If the transaction applying the update is aborted, the undo log is applied to restore the block of data back to its original state.

In certain embodiments, the actual number of updates that are done is relatively small compared to the amount of new blocks of data that are appended. Embodiments only log the updates of existing blocks of data, while newly appended pages do not need to be logged because typically the catalogs controlling the blocks of data will not reflect the newly added blocks of data until the transaction commits. The same mechanism protecting the updated blocks of data also protects the catalogs when they are updated with information about the newly appended blocks of data.

In certain embodiments, database engines use memory mapped (mmap) files to store blocks of data in memory. These database engines allow for appends of new blocks of data to existing tables. The append of the new blocks of data happens in batch operations (which may also be referred to as transactions), where multiple tables are updated by a single batch operation. Once the batch operation completes, the tables are hardened (copied) to the data store (e.g., disk) (e.g., using an msync( ) operation). When blocks of data are stored in a mmap file, the application has little control over when updated blocks of data are flushed to the data store. The in-memory undo log engine 120 provides recoverability of blocks of data in the event of a unplanned outage by providing recoverability of those updated blocks of data that the operating system independently chooses to flush to the data store while in the midst of the transaction.

The mmap file may have memory protection semantics applied to that mmap file. When an update is applied to the mmap file, an interrupt is generated containing the location of the violation (of the protection semantics). The in-memory undo log engine 120 translates the location into a specific block of data within the mmap file. The in-memory undo log engine 120 saves that block of data to an undo log and releases the protection of the block of data, allowing the update to complete. When the transaction is complete, the in-memory undo log engine 120 flushes the undo log. At periodic times, the mmap file may be flushed, mprotect turned back on, and the undo removed.

In certain embodiments, the in-memory undo log engine 120 builds an undo log for in-memory databases. In certain embodiments, the in-memory undo log engine 120 exploits the use of the operating system mechanism mprotect( ) to identify changed blocks of data in an in-memory database for the purpose of building an undo log that can be used to restore the blocks of data in the event of the abort of the transaction that applied the update. In such embodiments, the in-memory undo log engine 120 exploits the mprotect( ) function in order to track changes to the blocks of data, enabling the operating system to generate a segmentation fault (seg fault), such that the interrupt information includes the offending address (that address can be mapped to a specific portion of a page in memory, such as a block of data). As part of the interrupt handling, the in-memory undo log engine 120 logs a copy of the block of data prior to the update to an undo log, relaxes the memory page protection, and allows the update to proceed. With these embodiments, if the transaction applying the update is aborted, the undo log is applied to restore the block of data back to its original state.

Cloud Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
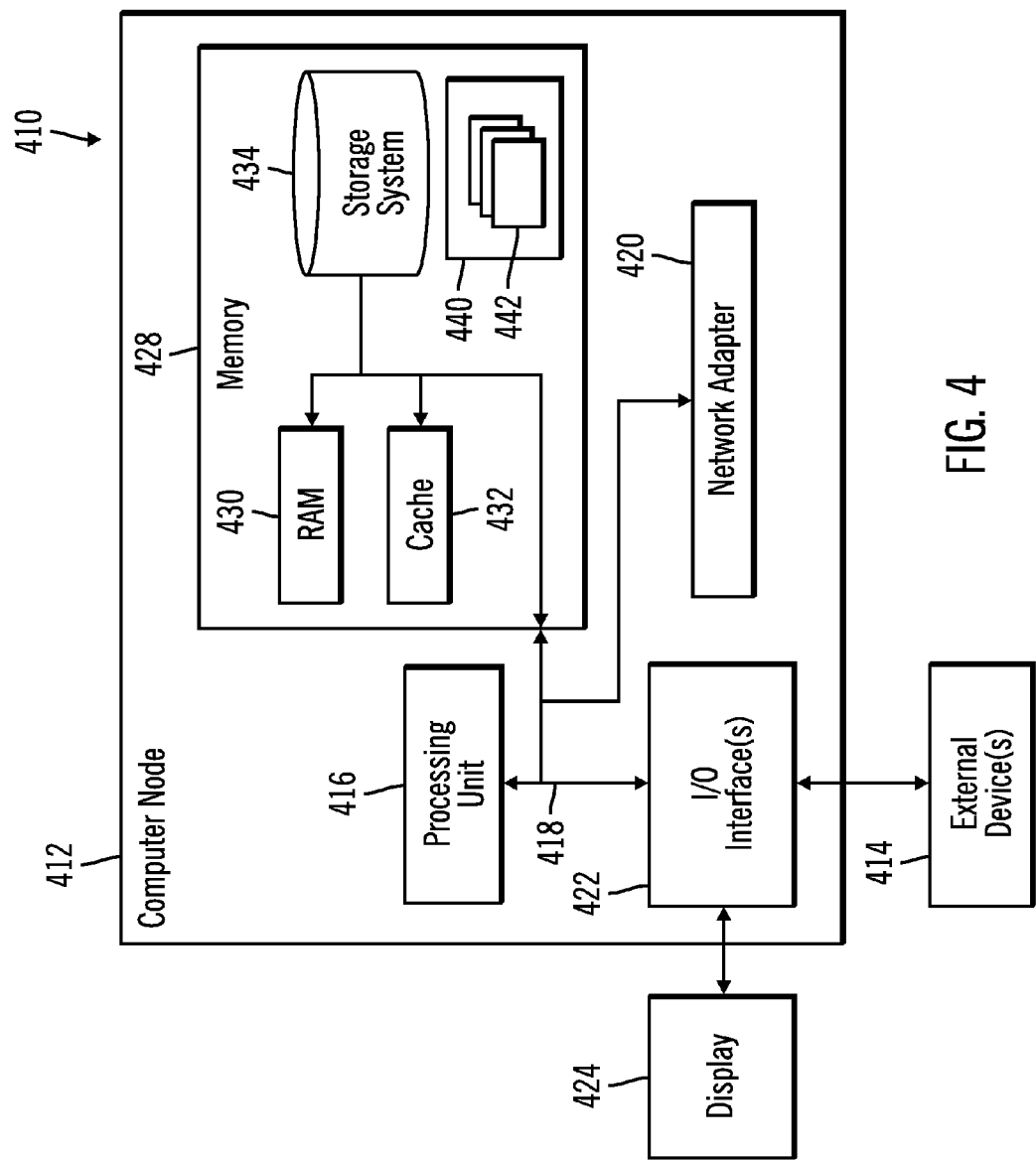
FIG. 4 depicts a cloud computing node in accordance with certain embodiments.

Referring now to FIG. 4, a schematic of an example of a cloud computing node is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
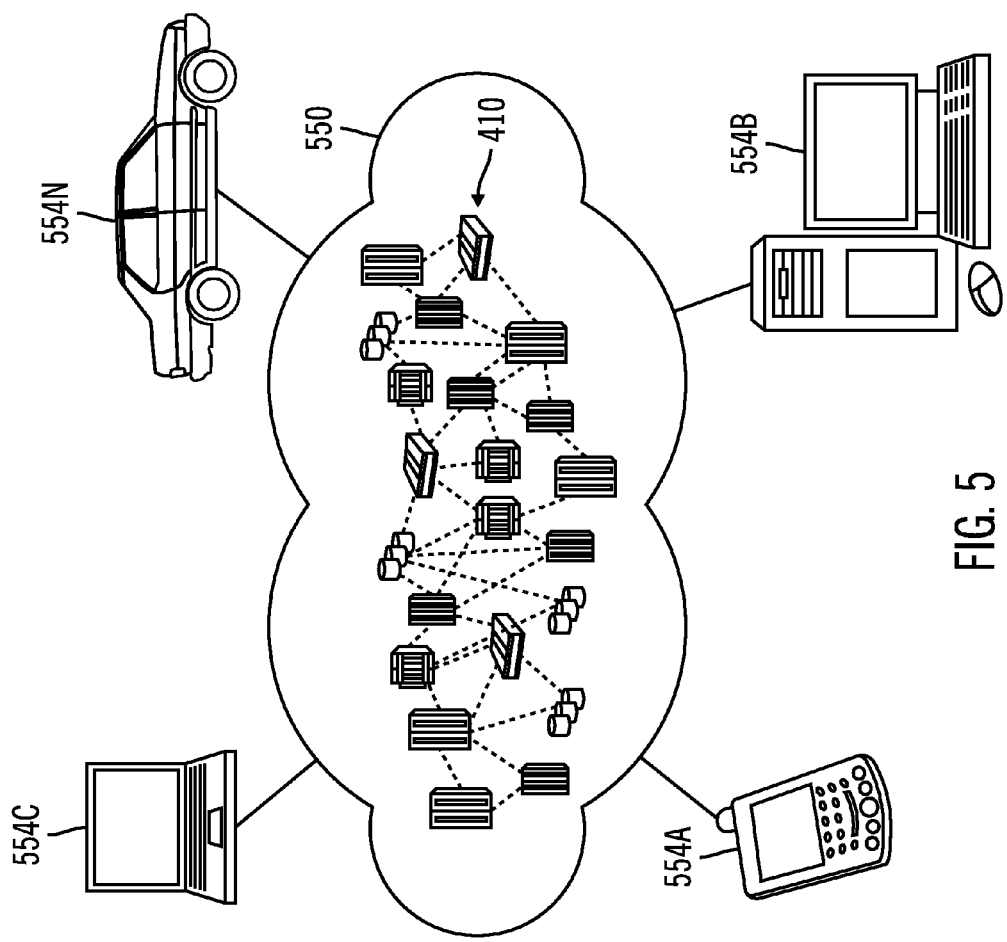
FIG. 5 depicts a cloud computing environment in accordance with certain embodiments.

Referring now to FIG. 5, illustrative cloud computing environment 550 is depicted. As shown, cloud computing environment 550 comprises one or more cloud computing nodes 410 with which local computing devices used by cloud consumers, such as, for example, personal digital assistant (PDA) or cellular telephone 554A, desktop computer 554B, laptop computer 554C, and/or automobile computer system 554N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 410 and cloud computing environment 550 can communicate with any type of computerized device over any type of network and/or network addressable connection (e.g., using a web browser).

Figure 6:
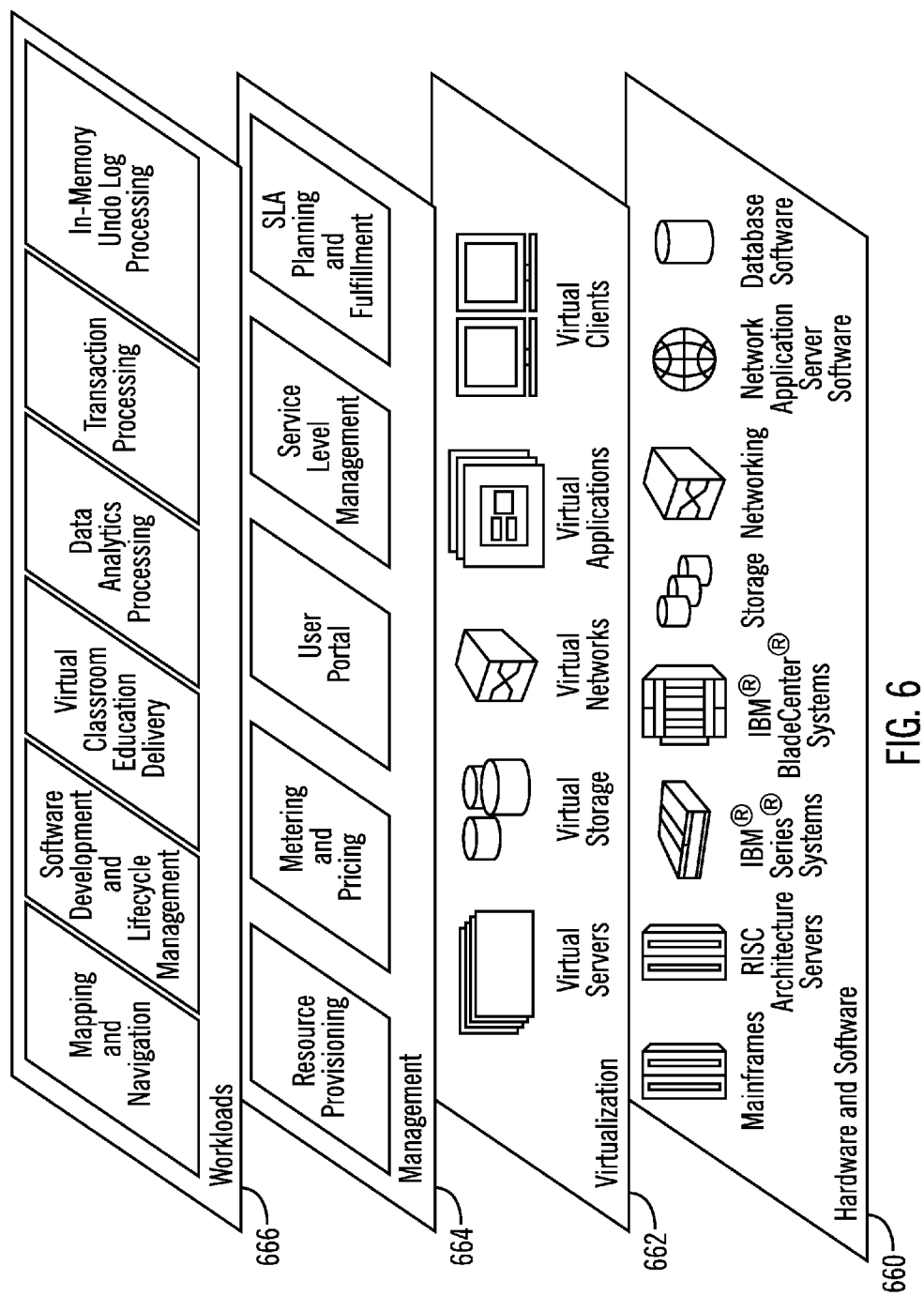
FIG. 6 depicts abstraction model layers in accordance with certain embodiments.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and in-memory undo log processing.

Thus, in certain embodiments, software or a program, implementing in-memory undo log processing in accordance with embodiments described herein, is provided as a service in a cloud environment.

In certain embodiments, the computing device 100 has the architecture of computing node 410. In certain embodiments, the computing device 100 is part of a cloud environment. In certain alternative embodiments, the computing device 100 is not part of a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method, comprising:
    setting, using a processor of a computer, a permission on a block of data in an in-memory database to prevent updates to that block of data using a memory protection function;
    in response to an update operation attempting to update the block of data,
        receiving an interrupt with a location of the block of data;
        copying the block of data to an undo log entry in an undo log; and
    setting the permission on the block of data to allow the update to that block of data to proceed using the memory protection function;
    in response to determining that a transaction that included the update operation for the block of data has committed, removing the undo log entry from the undo log;
    in response to determining that the transaction that included the update operation has failed, using the undo log entry to restore the block of data by copying the block of data from the undo log entry back to the in-memory database; and
    in response to one of removing the undo log entry and using the undo log entry to restore the block of data, setting the permission on the block of data to block updates to that block of data.

2. The method of claim 1, wherein the memory protection function allows pages of memory to be marked with characteristics, and wherein one of the characteristics is blocking write access to the pages of memory.

3. The method of claim 1, wherein a transaction updates multiple tables in the in-memory database.

4. The method of claim 1, wherein memory stores the in-memory database.

5. The method of claim 1, wherein software is provided as a service in a cloud environment.

* * * * *